United States Patent [19]

Stilber

[11] 4,227,566
[45] Oct. 14, 1980

[54] BUILDING SOLAR ENERGY HEATING SYSTEM AND COOLING SYSTEM

[76] Inventor: John Stilber, 7130 Captain Kidd Ave., Sarasota, Fla. 33581

[21] Appl. No.: 915,359

[22] Filed: Jun. 14, 1978

[51] Int. Cl.³ .......................... F28D 21/00; F24J 3/02
[52] U.S. Cl. ........................................ 165/1; 165/45; 165/48 S; 126/431; 126/452
[58] Field of Search ............... 237/1 A; 165/48 S, 49, 165/53, 45, 48, 56, 58, DIG. 6; 126/270, 430, 431, 428, 429, 452; 62/260

[56] References Cited

U.S. PATENT DOCUMENTS

| | | | |
|---|---|---|---|
| 1,830,099 | 11/1931 | Dollinger | 165/49 |
| 2,529,621 | 11/1950 | Mayo | 237/1 A |
| 2,559,869 | 7/1951 | Gay | 237/1 A |
| 2,559,870 | 7/1951 | Gay | 165/45 |
| 4,000,850 | 1/1977 | Diggs | 237/1 A |
| 4,064,866 | 12/1977 | Knight | 126/271 |
| 4,089,142 | 5/1978 | Kachadorian | 165/45 X |
| 4,103,825 | 8/1978 | Zornig | 237/1 A |

*Primary Examiner*—Albert W. Davis
*Assistant Examiner*—Margaret A. Focarino

*Attorney, Agent, or Firm*—Clarence A. O'Brien; Harvey B. Jacobson

[57] ABSTRACT

A built-in solar combination heating and cooling system for a building, particularly a residence, having a sub-floor below grade, walls, one or more ceilings, and a peaked roof comprises a first heat exchange means and a second heat exchange means, where the first heat exchange means absorbs heat from the southerly surface of the roof, and the second heat exchange means exchanges heat from or to the walls, floors, and ceiling of the building, as well as the region below grade surrounding the building. During the heating mode of operation, the path of air is from the outside into the roof-mounted first heat exchange means, then into the second heat exchange means, and into the building through a blower mounted below grade inside the building. During the cooling mode of operation, the flow of air is from the interior of the building, into the second heat exchange means, where it is cooled by contact with surrounding subsoil, then into the first heat exchange means, where solar heating causes convective rise of heated air contained therein outward into the atmosphere, drawing air cooled in the second heat exchange means upward through the building to cool the building.

11 Claims, 4 Drawing Figures

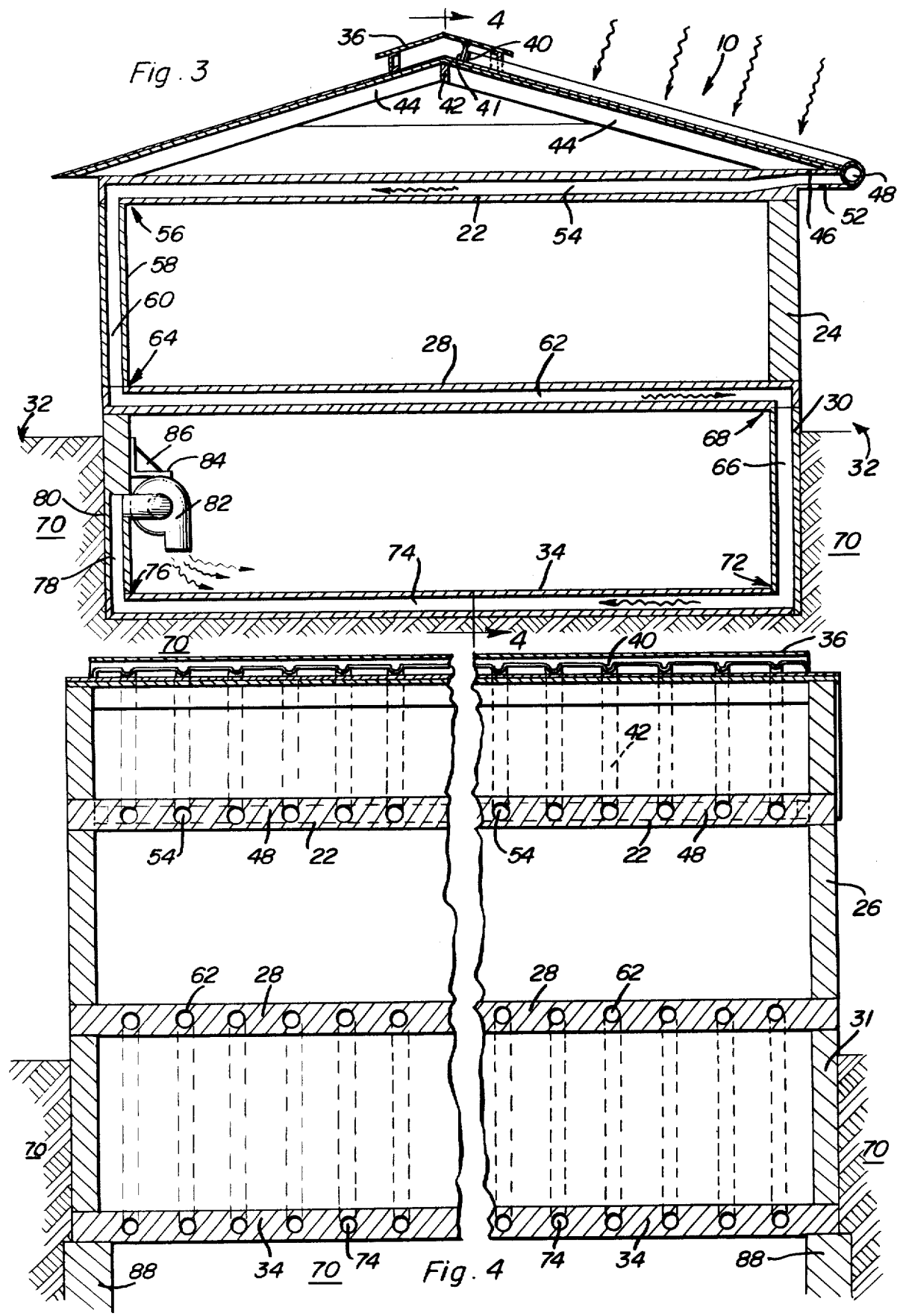

BUILDING SOLAR ENERGY HEATING SYSTEM AND COOLING SYSTEM

BACKGROUND OF THE INVENTION

1. Field of the Invention

The invention relates to a combination solar heating and cooling device for use in a building, particularly to a built-in combination heating and cooling device for a residential building comprising a roof-mounted first heat exchange means, for heating of air by absorption of solar energy, connected with a second heat exchange means adapted for alternate heating and cooling of the building interior.

2. Description of the Prior Art

Examples of combination cooling and heating devices for residential buildings, having circulation throughout the building, are known. For example, Takasaki in U.S. Pat. No. 3,989,098 shows a device for alternately circulating cooling or heating air through the ceiling, walls and floor of a residential building. No teaching or suggestion of solar heating or cooling is made by Takasaki, however. Furthermore, floor-to-attic circulation path is taught by Takasaki, unlike the "zig-zag" flow pattern of the present invention, presenting a greater heat exchange surface with the building interior.

It is also known in the prior art to use solar collectors as heat exchangers for a solar heating and cooling system for a liquid heat exchange medium. Diggs in U.S. Pat. No. 4,000,850 describes a solar heated and cooled modular building containing a plurality of roof-mounted solar panels for powering a heat pump, which then is operated to furnish either a heated or cooled heat exchange fluid for circulation throughout the building. Worthington in U.S. Pat. No. 3,957,109 mounts a solar collector and heat exchanger on a building roof, where heating occurs by operation as a heat trap, and cooling by evaporation of water sprayed upon an upper surface of the heat exchanger.

Each of the references enumerated teaches away from the present invention. In their complexity, by contrast with the relative simplicity of construction and operation of the building solar heating and cooling system of the present invention, they introduce unacceptable elements of expense and unreliability which have hampered use of solar energy in prior building constructions. For example, both Worthington and Diggs require circulation of a heat exchange fluid (see column 3, lines 25 to 33 of Diggs, and see column 3, lines 21 to 27 of Worthington). No suggestion of use of solar energy can be found in Takasaki. Heating and cooling of buildings is recognized as a major source of consumption of energy in the United States. Recognition in recent years of a constantly diminishing supply of fossil fuels as a source of energy has developed an awareness of the need to develop alternative sources of energy, such as collection of solar radiation. Many proposed devices and systems for collection of solar energy for heating or for cooling of buildings have, however, suffered from problems of excessive capital construction costs, operational unreliability due to their very complexity, costly damage due to leakage of water or other liquids, and installation of parts which are costly, corrodible, or difficult to replace and maintain.

SUMMARY OF THE INVENTION

Accordingly, it is an object of the present invention to provide a building solar energy combination cooling and heating system, where the system when operated in the heating mode circulates air warmed directly by absorption of solar energy, and when operated in the cooling mode utilizes absorbed solar energy to circulate air cooled by contact with subsoil underlying the building.

Another object of the invention is to provide a cored-type of building construction which allows columns of air enclosed within the building walls, floors, and ceilings to remove heat by conduction, during operation as a cooling system, or to conduct heat into the walls, floors and ceilings when operated as a heating system.

Still another object of the invention is to provide a solar energy combination cooling and heating system having no parts which can fail for the lifetime of the building, except for an easily replaced and easily accessible blower fan.

A further object of the invention is to provide a solar energy combination cooling and heating system requiring no plumbing or water pumps, obviating problems associated with corrosion of water pipes, pump failures, leakage of water, and employment of costly tubing made of copper or other relatively costly materials.

Yet another object of the present invention is to provide a building with a solar energy combination cooling and heating system where such building is fire resistant and structurally strong enough to resist major storms, such as hurricanes.

Another further object of the invention is to provide a building solar energy combination cooling and heating system manufactured from materials easily obtained and quite durable, utilizing a cored type of construction.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a sectional, transverse view taken substantially upon a plane passing along section line 2—2 on FIG. 1, showing the components and arrangement of both heat exchange means.

FIG. 4 is a sectional, longitudinal view with middle portions broken away, taken substantially along a plane passing along section line 4—4 on FIG. 3, showing the entire building with associated heat exchange means.

DETAILED DESCRIPTION OF THE INVENTION

Figure 1:
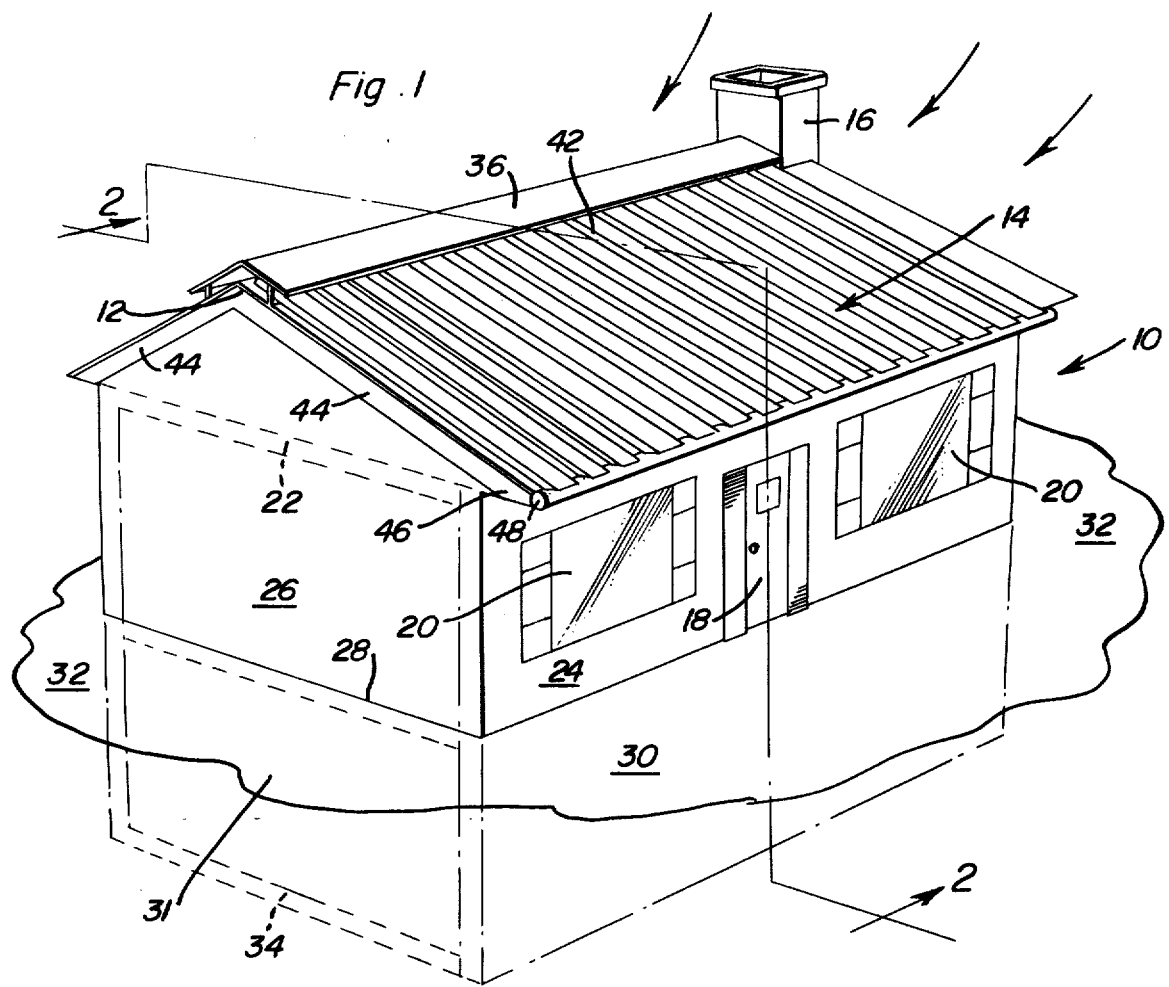
FIG. 1 is a perspective view of a residential building constructed with the built-in solar combination cooling and heating system of the present invention.

A building incorporating the built-in solar combination cooling and heating system is indicated generally by the numeral 10 and comprises a peaked roof having ridge 12, roof surface 14 facing the direction of maximum solar radiation, chimney 16, outside door 18, windows 20, ceiling 22, southerly wall 24, side wall 26, southerly basement wall 30, the major and lower portion of which lies below grade level 32, basement side wall 31, and subfloor 34. Parallel arrows directed toward southerly roof surface 14 represent the direction of incidence of solar energy impinging building 10. A hip roof may be substituted for the peaked gable roof illustrated in FIG. 1 to take advantage of morning and afternoon sunlight.

It is contemplated that the present invention can be utilized throughout the world, including areas south of the equator. In such locations, where the direction of incidence of solar radiation is generally from a northward direction, all references to southerly or northerly oriented elements of the present invention are to be reversed.

Figure 2:
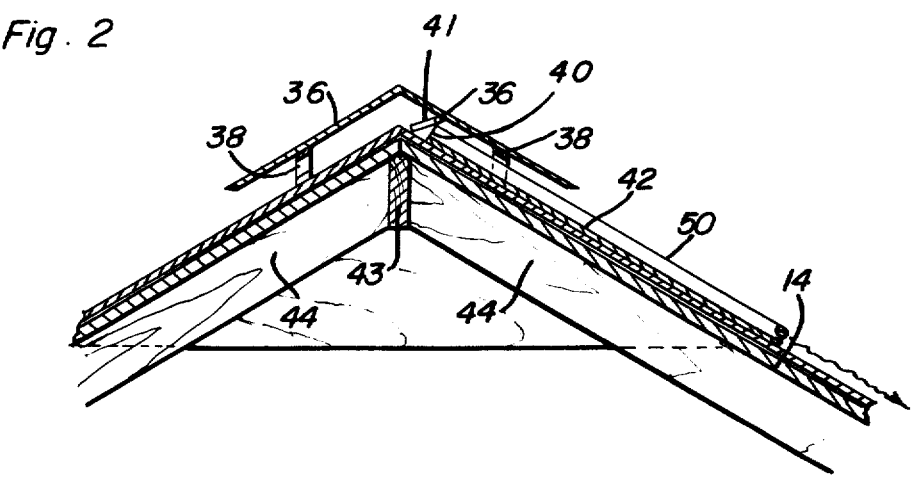
FIG. 2 is an enlarged, fragmental, sectional, trnsverse view taken substantially along a plane passing along section line 2—2 on FIG. 1, showing details of the roof-mounted first heat exchange means.

As illustrated in FIGS. 1 and 2 ridge vent 36, supported by mounts 38, permits a controlled amount of air to enter or exit through opening 40 of roof tubular panel 42 by adjustment of control means 41, while excluding rain, leaves, and other extraneous materials from entry into opening 40. Ridgepole 43 supports rafters 44, which terminate at their lower extremity at eave 46, which overhangs southernly wall 24 of building 10. Roof tubular panel 42, terminating in sealed connection 48, is preferably constructed of a metal having high thermal conductivity, such as aluminum, silver, or copper. Most preferred is aluminum, since it is comparatively inexpensive, durable, and easily obtained in the required quantity. Coating 50 on the upward exposed face of panel 42 is black or other dark color and is provided to decrease the albedo of roof tubular panel 42, increasing the absorption of energy from incident sunlight. Colors of exposed roof panels can be any dark colors for eye appeal, since the large area of working roof will not require 100% efficiency of absorption of intercepted sunlight. Portions of roof tubular panel 42 not exposed to sunlight should retain a bright finish. Sealed connection 48 and panels 42 comprise the first heat exchange means of the invention. Air transfer takes place from sealed connection 48 into the second heat exchange means of the invention, comprising channels and columns connected in the order described below and as shown in FIG. 3. Connection 48 connects to passageway 52 beneath eave 46, which connects to ceiling channel 54 within cored ceiling 22. Cored ceiling 22 is preferably constructed of prestressed concrete cored slabs, the channels of which run perpendicular to the plane of symmetry passing through ridgepole 43 of building 10. Connection between ceiling channels 54 in cored ceiling 22 is made at corner 56 with northward wall 58 having enclosed air column 60 correspondingly connected at corner 56 to the ceiling channel 54 within cored ceiling 22. Cored floor 28, having floor channels 62 running parallel to ceiling channels 54, is connected at corner 64 with the corresponding enclosed air columns 60 within northward wall 58 and a similar connection between floor channels 62 and basement enclosed air column 66 within southward basement wall 30, is made at corner 68. A portion of basement wall 30 lies below grade level 32 and is surrounded by subsoil 70. Connection at corner 72 is made between enclosed basement air columns 66 and corresponding subfloor channels 74 within subfloor 34, and a similar connection made at corner 76 between subfloor channels 74 and corresponding enclosed basement air columns 78 in northward basement wall 80. Blower 82 is adapted to draw air from enclosed basement air columns 78 forcing such air from the second heat exchange means into the interior of the building basement, the basement being enclosed by floor 28 (the underside of floor 28 serving as the basement ceiling), subfloor 34, and walls 30 and 80. Blower 82 is supported by mounting bracket 84, which is reinforced by wire 86, bracket 84 being mounted by suitable conventional means on northward basement wall 80. In operation in the heating mode, blower 82 is operated to draw air heated in the first heat exchanger means through the building walls, ceilings and floors, ultimately from air columns 78 into the interior of the basement. In operation in the cooling mode, blower 82 is not operated, and the flow of air is reversed, passing from the basement into air columns 78, thence upwardly to absorb heat from the building.

FIG. 4 shows schematically the structure of floor channels 62 and subfloor channels 74, as well as ceiling channels 54. Roof panels 42, are preferably flattened to present maximum surface area and promote maximum absorption of solar radiation. Aluminum roof panels 42 may be formed to comprise the complete roof without additional support. The building rests upon footings 88 resting within subsoil 70.

In both the heating and cooling modes of operation of the present invention, roof tubular panels 42 guide a heated air column, heated within roof tubular panels 42 through transfer of heat absorbed along southerly roof surface 14 from incident solar radiation. Either of the heating or cooling modes can be selected at the will of the operator, and alternate operation is possible and contemplated to be used on a daily cycle of operation. In the heating mode, air heated within roof tubular panels 42 is drawn downwardly through operation of blower 82 into the respective channels and enclosed air columns 54, 60, 62, 66, 74, and 78 of, respectively, ceiling 22, northward wall 58, floor 28, basement wall 30, subfloor 34, and northward basement wall 80. Air warmed within tubes 42 warms each of the component parts on its way downward through the entire building 10, and heat not so absorbed can be stored in subsoil 70 which surrounds walls 30 and 80 and underlying subfloor 34. Such stored heat can then be used after sunset, or during periods when sunlight is absent due to cloud cover. Additionally, direct warming of the interior air of the building occurs through the exit of warmed air forced from blower 82 into the building.

When operated in the cooling mode, blower 82 is disconnected and air is allowed to enter the second heat exchange means from the interior of the building, either through non-operation of blower 82 or through adjustable vents (not shown in the drawings) bypassing blower 82. Circulation of air occurs upward during the cooling mode, due to the buoyancy of air heated within roof panels 42. The buoyancy of heated air due to the inverse relationship between the temperature and density of a gas is well recognized in the art. As heated air emerges from opening 40 in roof tubular panel 42, air is drawn from ceiling channel 54 of cored ceiling 22 by way of passageway 52 into sealed connection 48, and in like fashion, air is drawn upward throughout the building. Use of air as the transfer agent in both the roof heat exchange system and the building heat exchange system obviates the necessity for any liquid medium, or the problems attendant with use of a liquid, including problems such as corrosion, damage from even small leaks, and installation of elaborate plumbing systems involving expensive materials, such as copper tubing. Moreover, the passageways for controlling the flow of air through the various components of the building structure are easily constructed from conventional materials, such as prestressed concrete cored slabs for floors and ceilings, and concrete or cinder blocks of the two-hole variety, stack laid, to form an easy passageway for flow of air through the block walls. Walls not having circulating air, such as wall 24 and the portion of wall 80 above grade 32, can also be stack laid. The thermal conductivity of concrete or cinder, and the large area exposed to the interior of the building, provides a suitable heat exchange means for transfer of heat into or from the interior of the building. Although small leaks do not cause the damage resulting from small leaks in liquid-filled heat exchange systems, care should be exercised to provide air-tight connections at every junction of walls and ceilings or floor channels, namely, corners 56, 64, 68, 72 and 76. Slight leaks lower the efficiency of the system due to mixing of leaked air with air used for heating or cooling. Due to generally lower air flow rates expected during the cooling mode of operation, the effect of slight leaks can be expected to be more severe in such mode than during operation in the heating mode.

Subfloor 34, composed of cored slabs, is placed in direct contact with subsoil 70 to promote heat exchange between air contained in subfloor channels 74 and the subsoil 70. Use of an air pocket or vapor barrier between subfloor 34 and subsoil 70 is to be avoided, since heat exchange with subsoil 70 occurs both during the cooling mode of operation, when air within the channels 74 is cooled by heat exchange with subsoil 70 and circulated throughout the building in the manner described above, as well as in the heating mode of operation, when heat gathered by air contained within roof tubular panels 42 is in part stored within the subsoil 70 surrounding subfloor 34.

Preferably, the portion of all walls above grade and the upper ceiling are insulated to prevent heat transfer to air outside the building while heat is exchanged between the walls and ceilings with interior inside the building.

The versatility of the present invention is evident in the fact that it can use an otherwise wasted source of energy supplied by nature. Direct sunlight is a daily event following a pattern determined by the position of the earth in its orbit. Not far below the surface of the soil, the constant soil temperature represents a storage of the average yearly energy collected from the sun, and the observable fact that such subsoil is cooler than the outside summer temperture is utilized in the present invention in its cooling mode of operation. To operate in the heating mode, it is only necessary to reverse the flow of air by operation of a simple blower, and alternate heating and cooling are conveniently possible as necessary.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A built-in solar combination heating and cooling system for a building having a subfloor, walls, one or more ceilings, and a roof having a ridge and eaves, the southerly surface of said roof being exposed generally in the direction of maximum solar radiation, said system comprising a first heat exchange means and a second heat exchange means, said first heat exchange means comprising a sealed connection and a plurality of air-filled tubular roof solar panels secured to said roof, connected to said sealed connection, and extending from ridge vents along said ridge to said sealed connection, said panels have openings along said ridge for allowing air to enter or exit said panels, said second heat exchange means comprising in continuous sealed interconnected relationship cored air-filled slabs comprising said ceilings, a plurality of hollow air-filled blocks comprising said walls, a cored air-filled slab comprising said subfloor, an opening from said second heat exchange means into the interior of said building, and an air blower interposed between said opening and the interior of said building, said air blower being adapted to transfer air from said second heat exchange means into said building, said first heat exchange means being connected at said sealed connection to said second heat exchange means.

2. The heating and cooling system of claim 1 wherein said cored air-filled slabs comprising said ceilings and said subfloor are formed of prestressed concrete.

3. The heating and cooling system of claim 1 wherein said panels are flattened and coated with a radiant energy-absorbent composition.

4. The heating and cooling system of claim 3 wherein said building has a lower portion surrounded by subsoil, said subfloor being in heat exchange relationship with said subsoil, said opening being located within one of said walls connected to said subfloor so that said continuous sealed interconnected relationship includes said subfloor between said opening and said first heat exchange means.

5. The heating and cooling system of claim 4 wherein said solar panels are made of aluminum.

6. The heating and cooling system of claim 5 wherein said ridge vents include control means for adjusting the rate of flow of air therethrough.

7. The heating and cooling system of claim 6 wherein said blocks are two-hole, stack laid, cement blocks.

8. The heating and cooling system of claim 1 wherein said walls comprise a portion above grade with an exterior surface and said ceilings have an upper ceiling with an upper surface, said portion above grade having insulation between said hollow air-filled blocks and said exterior surface, and said upper ceiling being insulated thereabove to reduce heat flow from the interior of said building.

9. The heating and cooling system of claim 6 wherein said blocks are two-hole, stack laid, cinder blocks.

10. A method of heating a building having a subfloor, walls, one or more ceilings, and a roof having a ridge and eaves, the southerly surface of said roof being exposed generally in the direction of maximum solar radiation, said building comprising a first heat exchange means and a second heat exchange means, said first heat exchange means comprising a sealed connection and a plurality of air-filled tubular roof solar panels secured to said roof, connected to said sealed connection, and extending from ridge vents along said ridge to said sealed connection, said panels have openings along said ridge able to permit air to enter or exit through said panels, said second heat exchange means comprising in continuous sealed interconnected relationship cored air-filled slabs comprising said ceilings, a plurality of hollow air-filled blocks comprising said walls, a cored air-filled slab comprising said subfloor, an opening from said second heat exchange means into the interior of said building, and an air blower interposed between said opening and the interior of said building, said first heat exchange means being connected at said sealed connection to said second exchange means, said method of heating comprising operating said blower to draw air from said second heat exchange means through said opening and into the interior of said building, thereby generating a suction to force air into said second heat exchange means from said first heat exchange means, and through said openings in said panels into said first heat exchange mens, heating air in said first heat exchange means by solar exposure on said roof panels, and imparting the heat acquired by said air in said first heat exchange means to the interior of the building by said blower and heat conduction from said second heat exchange means.

11. A method of cooling a building provided with a subfloor, walls, ceilings, floors and a roof, substantially the entire surface area of said subfloor resting in subsoil, said subfloor, walls, ceilings, and floors being of cored construction and connected together in series to a cored portion of said roof, said cored portion comprising a plurality of air-filled tubular roof solar panels secured to said roof, said panels having openings to permit air to exit through said panels, an opening from one of said walls into the interior of said building, said opening being located within one of said walls connected to said subfloor, said method of cooling comprising permitting air to exit through said panel openings thereby generating a suction to draw air into said cored construction of said roof, ceilings, walls, and floors from said subfloor, and through said opening from the interior of the building to said sub-floor, said air in the cored construction of said subfloor being cooled by said subsoil and cooling the entire building as said cooled air is circulated through the cored construction of said building and out through said panel openings.

* * * * *